(12) United States Patent
Sergi

(10) Patent No.: US 10,742,265 B2
(45) Date of Patent: Aug. 11, 2020

(54) METHOD FOR ACCESS TO A SHARED COMMUNICATION MEDIUM

(71) Applicant: SAGEMCOM ENERGY & TELECOM SAS, Rueil Malmaison (FR)

(72) Inventor: Jérémie Sergi, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 78 days.

(21) Appl. No.: 15/807,749

(22) Filed: Nov. 9, 2017

(65) Prior Publication Data

US 2018/0138946 A1    May 17, 2018

(30) Foreign Application Priority Data

Nov. 15, 2016 (FR) .................... 16 61054

(51) Int. Cl.
*H04B 3/54* (2006.01)
*H04L 12/413* (2006.01)
*H04W 74/08* (2009.01)

(52) U.S. Cl.
CPC .............. *H04B 3/542* (2013.01); *H04B 3/54* (2013.01); *H04L 12/413* (2013.01); *H04W 74/0808* (2013.01); *H04B 2203/5408* (2013.01); *H04B 2203/5433* (2013.01)

(58) Field of Classification Search
CPC .. H04B 3/54; H04B 3/542; H04B 2203/5408; H04B 2203/5429; H04B 2203/5433; H04L 12/413; H04W 74/08; H04W 74/0808; H04W 74/0816; H04W 74/085
See application file for complete search history.

(56) References Cited

U.S. PATENT DOCUMENTS

| | | | | |
|---|---|---|---|---|
| 6,735,173 B1 * | 5/2004 | Lenoski | ................... | H04L 47/10 370/235 |
| 7,027,462 B2 * | 4/2006 | Benveniste | ......... | H04L 12/4013 370/445 |
| 7,085,532 B2 * | 8/2006 | Palin | ..................... | H04W 8/005 455/41.2 |
| 7,095,754 B2 * | 8/2006 | Benveniste | ............. | H04L 47/10 370/465 |

(Continued)

OTHER PUBLICATIONS

Apr. 24, 2017 Search Report issued in French Patent Application No. 1661054.

(Continued)

*Primary Examiner* — Alpus Hsu
(74) *Attorney, Agent, or Firm* — Oliff PLC; R. Brian Drozd

(57) ABSTRACT

A method for access to a shared communication medium, referred to as the medium, access to the medium being of the "carrier sense multiple access" type, wherein an electronic device, in order to be able to send a message over the medium, the message including information representing a message type, waits for a backoff time before checking whether the medium is available to send the message, the backoff time being determined randomly and lying between a minimum backoff time and a maximum backoff time, wherein the maximum backoff time is dependent on the type of message to be sent over the medium by the electronic device.

8 Claims, 4 Drawing Sheets

(56) References Cited

U.S. PATENT DOCUMENTS

| | | | |
|---|---|---|---|
| 7,274,708 B2* | 9/2007 | Benveniste | H04L 12/4013 370/338 |
| 7,376,143 B2* | 5/2008 | Liu | H04W 74/085 370/448 |
| 7,664,132 B2* | 2/2010 | Benveniste | H04L 12/4013 370/338 |
| 7,864,674 B2* | 1/2011 | Benveniste | H04L 47/10 370/230 |
| 7,983,271 B2* | 7/2011 | Benveniste | H04L 47/10 370/395.4 |
| 8,532,134 B2* | 9/2013 | Benveniste | H04L 47/10 370/448 |
| 8,599,753 B2* | 12/2013 | Son | H04W 74/008 370/328 |
| 8,612,617 B2* | 12/2013 | Yaqoob | H04L 12/1868 370/312 |
| 8,913,597 B2* | 12/2014 | Benveniste | H04L 47/14 370/338 |
| 9,107,220 B1* | 8/2015 | Sherman | H04W 72/005 |
| 9,198,198 B2* | 11/2015 | Vedantham | H04W 74/0816 |
| 9,270,606 B2* | 2/2016 | Benveniste | H04L 47/10 |
| 9,319,906 B2* | 4/2016 | Benveniste | H04W 74/02 |
| 9,445,436 B2* | 9/2016 | Viger | H04W 74/0816 |
| 9,531,563 B2* | 12/2016 | Vedantham | H04W 74/0816 |
| 9,622,265 B2* | 4/2017 | Sun | H04W 74/0816 |
| 9,980,290 B2* | 5/2018 | Lin | H04W 74/0816 |
| 2005/0025176 A1* | 2/2005 | Ko | H04W 74/085 370/448 |
| 2005/0089002 A1* | 4/2005 | Shin | H04W 28/18 370/338 |
| 2009/0122807 A1 | 5/2009 | Yoshizawa et al. | |
| 2011/0182178 A1 | 7/2011 | Du et al. | |
| 2012/0147899 A1* | 6/2012 | Du | H04L 12/413 370/447 |
| 2015/0180680 A1 | 6/2015 | Vijayasankar et al. | |
| 2015/0215101 A1* | 7/2015 | Tandai | H04L 27/0006 370/252 |

OTHER PUBLICATIONS

IEEE Communications Society; "IEEE Standard for Broadband over Power Line Networks: Medium Access Control and Physical Layer Specifications;" IEEE Standards Association; pp. 1-1586; Dec. 30, 2010.

Prime Alliance Technical Working Group; "Specification for PoweRline Intelligent Metereing Evolution;" Prime Alliance; pp. 1-338.

* cited by examiner

METHOD FOR ACCESS TO A SHARED COMMUNICATION MEDIUM

BACKGROUND

The present invention relates to the field of telecommunications on a shared transmission medium. The invention relates more particularly to a method for access to the shared transmission medium used by an electronic device sharing the transmission medium in order to send messages.

When a plurality of electronic devices must share the same transmission medium (hereinafter "the medium"), a technique for organising the sharing of said medium between the various electronic devices must be established. Historically, when the medium to be shared was a radio-frequency band, a technique known as "carrier sense multiple access" was developed. The principle of such a method for access to the medium is that an electronic device wishing to send a message over a shared medium will commence by checking that the medium is available before sending the message. The access method has been improved over the years, in particular in order to best adapt to the medium used. The medium used may be an electrical network, and a so-called "powerline communication" (PLC) is then spoken of. Thus technical specifications, including such a method for access to a shared medium, have been produced. The technical specification "PoweRline Intelligent Metering Evolution" (PRIME) developed by the "PRIME Alliance Technical Working Group", for example in version 1.4 thereof published in October 2014, which is incorporated herein by reference in its entirety, comprises a description of the method for access to a shared medium by electronic devices such as communicating energy meters. The method for access to a medium, more particularly to one of the channels defined in the technical specifications, is defined in Chapter 4.3.3 ("Channel access") of the technical specifications. FIG. 32 of the PRIME v1.4 technical specifications ("Flow chart for CSMA-CA algorithm") illustrates said method for access to the medium, the medium here being a PLC transmission channel. This method is set out in FIG. 1, and illustrates a method 100 for access to a shared medium executed by an electronic device in accordance with the PRIME v1.4 technical specifications. A concise description of the method is given below, the details can advantageously be found in the PRIME v1.4 technical specifications published in October 2014, in particular Chapter 4.3.3, pages 77 to 83.

The method 100 comprises a first step 101 of receiving a request to send a message (a request referred to as "CSMA-CA Req") on the shared medium, here a PLC channel. Parameters ("txAttemps", "chSenseCount" and "burstLen" for example) are initialised to default values (for example here "zero" for the three parameters) in a step 102. In a step 103, the value of a parameter "macSCPChSenseCount" is fixed at "priority +1", the parameter "priority" enabling the electronic device executing the method to prioritise the messages to be sent. In a step 104, the electronic device executing the method 100 determines a waiting time (parameter "macSCPRBO", also referred to as "backoff time"), also referred to as "random backoff time, RBO", used for an attempt to send the message over the medium. The value of the backoff time, that is to say of the parameter "macSCPRBO", is determined in accordance with the following formula:

$$macSCPRBO = \\ random\left(0, \min\left(\left(2^{(priority+txAttemps+macCSMAR1)} + macCSMAR2\right), \left(\frac{macSCPLength}{2}\right)\right)\right)$$

With "random(A, B)", a mathematical function determining a random value and lying between the values of the arguments A and B of the function random, "min(A, B)", a mathematical function determining the minimum value between the values of the arguments A and B of the function min, "priority", "txAttemps" the previously described parameters, "macCSMAR1" and "macCSMAR2" two predetermined parameters, the values of which are fixed by the PRIME technical specifications ("macCSMAR1=3" and "macCSMAR2=1", cf. Table 97 on page 239 of the PRIME v1.4 technical specifications), and "macSCPLength" a parameter representing the duration of a contention period ("Shared Contention Period—SCP") used by the method for sending a message in accordance with the PRIME technical specifications.

Thus the backoff time "macSCPRBO" is determined randomly and lies between a minimum backoff time and a maximum backoff time. According to the previously described formula, the minimum backoff time is "zero". Likewise, the maximum backoff time, referred to as "Tmax", is equal to:

$$Tmax = \\ \min\left(\left(2^{(priority+txAttemps+macCSMAR1)} + macCSMAR2\right), \left(\frac{macSCPLength}{2}\right)\right)$$

In a following step 105, and before commencing a backoff time, the electronic device executing the method must check that the remaining time for the contention period in question is sufficient to accommodate the backoff time, the number of channel sensing phase iterations and the time for any transmission of the message ("Tx time"). If the time remaining for the contention period is insufficient, the backoff time must be cancelled and recommence during the next contention period. Thus, in step 105, the electronic device checks that (macSCPRBO+"iteration time"+Tx time) is less than or equal to the remaining contention period time (SCP).

If this is not the case, in a step 106, the electronic device awaits the following contention period in order to recommence the process at step 104, a new backoff time value "macSCPRBO" then being generated.

If such is the case, that is to say there remains sufficient time in the contention period to accommodate the backoff time, the channel sensing phase iterations and the time for transmitting a message ("Tx time"), in a step 107, then the electronic device waits for the backoff time ("macSCPRBO") determined during step 104. This backoff time is expressed as a number of symbol times ("duration symbol") used on the transmission channel, a symbol time being typically equal to "2.24 ms".

Once the backoff time has elapsed, the electronic device, in a step 108, performs a channel sensing phase in order to determine whether the transmission channel is available (idle) or busy. The medium is busy typically since another message is being sent by another electronic device sharing the medium.

In other words, the electronic device waits for a backoff time "macSCPRBO", during a step 107, in order to check, in a step 108, whether the medium is available for sending the message.

In a step 109, according to the state of the medium determined at step 108, the electronic device passes to a step 110 if the medium is available or to a step 121 if the medium is busy.

In the case where the channel is available, the electronic device, in step 110, checks the value of the parameter "chSenseCount". If this parameter is equal to the value of a predetermined parameter "macSCPChSenseCount", then the electronic device, in a step 130, sends the message over the transmission medium. Possibly, the value of "macSCPChSenseCount" is defined as being equal to "priority +1".

In the case where "chSenseCount" is less than "macSCPChSenseCount", then the electronic device, in a step 111, increments the value of the parameter "chSenseCount". The value is typically incremented by "1". Following this incrementation, in a step 112, the electronic device waits for a period "macCSMADelay", a period typically equal to "3 ms". The electronic device then once again executes step 108 in order to determine the state of the channel, and possibly recommences the cycle of steps 108 to 112 as long as the medium is available, in order ultimately to end with the sending of the message during step 130.

If, during a step 109, the electronic device finds that the state of the medium determined during step 108 is "busy", then the electronic device passes to a step 121. In step 121, the electronic device compares the value of the parameter "txAttemps" with the value of a parameter "macSCPMaxTxAttemps". In the case where the value of "txAttemps" is equal to the value of "macSCPMaxTxAttemps", then, in a step 140, the electronic device declares failure of the sending of the message. Possibly, an error message is sent to another electronic device or an entry is updated in a log file. In the case where the value of "txAttemps" is less than the value of "macSCPMaxTxAttemps", then the electronic device, in a step 122, increments the value of "txAttemps". The incrementation is typically by "1". Next, the electronic device resets the value of the parameter "chSenseCount" to zero. Then the electronic device, in a step 124, determines the value of "burstLen" by fixing it equal to the length of a current message ("burst length") sent over the medium and detected during step 108. This information is supplied by a physical layer of the electronic device. In a step 125, the electronic device next waits for the period "burstLen" previously defined, that is to say until the end of the sending of the current message. The electronic device then resumes the method 100 at step 104, determining a new backoff time value "macSCPRBO" in order to recommence a cycle.

The method ends after a step 130 or a step 140, that is to say either after a sending of the message over the medium or a finding that the sending has failed.

This method, implemented in the PRIME v1.4 technical specifications, but also in other technical specifications, thus allows sharing of the medium between a plurality of electronic devices sharing this medium equitably. However, it has a few drawbacks.

First of all, by its nature, the transmission of a message over a channel of the PLC type is unreliable. That is to say, for any reason, such as interference on an electrical line, a message is frequently lost and must be resent. The resending time means that in the end the transmission of the information included in the messages is done with a certain latency. In a PLC network, this latency time may be detrimental for certain applications, such as for example the collection of metering data or the setting of the time of a communicating energy meter. It would be desirable to be able to benefit from better latency in certain cases. Likewise, the method described above is not necessarily optimum in the cases where few messages are sent over the medium. More generally, it will be desirable to be able to reduce the latency, highly dependent on the backoff time "macSCPRBO", in certain cases.

It is consequently desirable to overcome these drawbacks of the prior art.

SUMMARY

The invention relates to a method for access to a shared communication medium, referred to as the medium, access to the medium being of the "carrier sense multiple access" type, wherein an electronic device, in order to be able to send a message over the medium, the message comprising information representing a message type, waits for a backoff time before checking whether the medium is available for sending the message, the backoff time being determined randomly and lying between a minimum backoff time and a maximum backoff time (referred to as "Tmax"), the maximum backoff time being dependent on the type of message to be sent over the medium by the electronic device.

Advantageously, the latency of access to the medium may be adapted according to the type of message to be sent over the medium.

According to a supplementary embodiment of the invention, a first list, comprising at least one first type of message, is associated with a first maximum backoff time and at least one second list, comprising at least one second message type, is associated with a second maximum backoff time, the maximum backoff time is chosen so as to be equal to the maximum backoff time associated with a list comprising the message type to be sent by the electronic device.

Advantageously, a plurality of lists comprising message types to be sent can make it possible to adapt the sending latency according to the message type to be sent.

According to a supplementary embodiment of the invention, the first list comprises a message type known as a "data message".

Advantageously, the messages of the "data message" type benefit from reduced latency in order to improve the reaction time of applications executed by the electronic device.

According to a supplementary embodiment of the invention, the first maximum backoff time is less than the second maximum backoff time.

Advantageously, choosing to reduce a maximum backoff time for messages makes it possible to reduce on average the backoff time for sending a message and ultimately to reduce the sending latency for the messages concerned.

According to a supplementary embodiment of the invention, the method comprises, for an electronic device sharing access to the medium, the following steps of estimating a degree of occupation of the medium and, if the degree of occupation of the medium is below a predetermined value, then the maximum backoff time is chosen so as to be equal to the first maximum backoff time independently of the type of packet to be sent.

Advantageously, the latency time of the messages sent may be reduced when the degree of occupation of the medium is low. The low occupation of the medium reduces the risk of collision.

According to a supplementary embodiment of the invention, the maximum backoff time (Tmax) is determined by the formula:

$$Tmax = \min\left((2^{(txAttemps+macCSMAR1)} + macCSMAR2), \left(\frac{macSCPLength}{2}\right)\right)$$

with "txAttemps" and "macSCPLength" predefined variables, values of the variables "macCSMAR1" and "macCSMAR2" being determined according to the type of message to be sent by the electronic device.

According to a supplementary embodiment of the invention, the value "macCSMAR1" and respectively "macCSMAR2" is chosen so as to be equal to "1" and respectively "0" for at least one message type.

According to a supplementary embodiment of the invention, the method for access to the shared communication medium is in accordance with a communication standard of the IEEE Std 1901-2010 type, with the exception of the step for determining a maximum backoff time for sending a message.

The invention also relates to an electronic device suitable for implementing a method for access to a shared communication medium, referred to as the medium, the access to the medium being of the "carrier sense multiple access" type, the electronic device, in order to be able to send a message over the medium, the message comprising information representing a message type, waiting for a backoff time before checking whether the medium is available for sending the message, the backoff time being determined randomly and lying between a minimum backoff time and a maximum backoff time, the electronic device being characterised in that it is suitable for determining the maximum backoff time according to the type of message to be sent over the medium.

The invention also relates to a computer program, which may be stored on a medium and/or downloaded from a communication network, in order to be read by a processor. This computer program comprises instructions for implementing all or some of the steps mentioned below, when said program is executed by the processor.

The invention also relates to an information storage medium comprising such a computer program.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION

Figure 2:
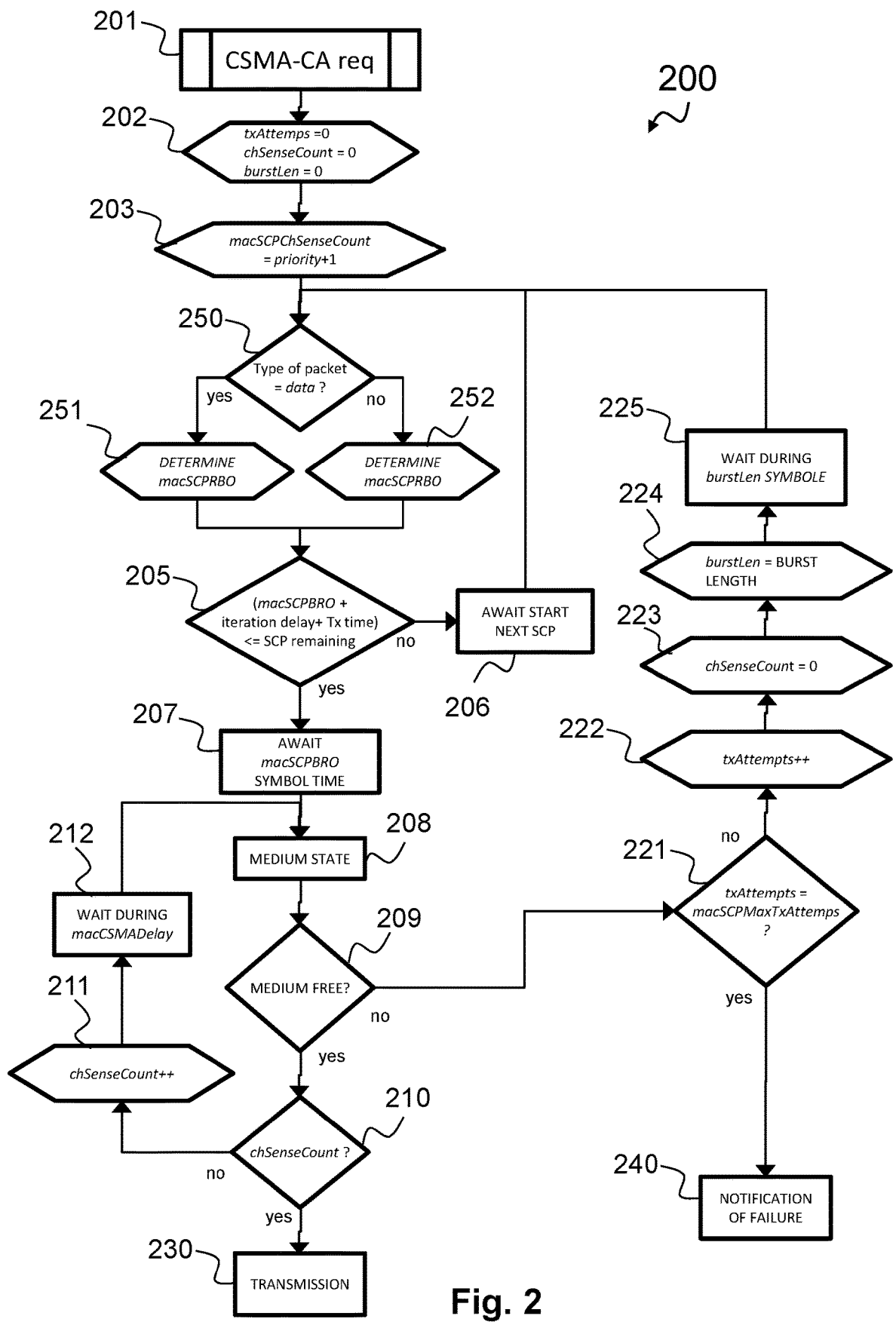
FIG. 2 illustrates schematically a method for access to a shared medium according to an embodiment of the invention.

FIG. 2 illustrates schematically a method 200 for access to a shared medium according to an embodiment of the invention. The message to be sent comprises information representing a message type. For example, the message type may be a "data message" type or a "control message" type. The "data message" type may correspond to messages comprising data for applications of the electronic device executing the method. The "control message" type may correspond to messages comprising information related to the correct functioning of a routing or frame-relay protocol, messages exchanged with other neighbouring electronic devices or a particular control electronic device (for example a switch node). The message type may correspond to a "PKT.C" field defined in the PRIME v1.4 technical specifications (page 104), said field being coded in "1" bit. For example, the information "PKT.C=0" indicates a message of the data message (data packet) type and the information "PKT.C=1" indicates a message of the control message (control packet) type.

Figure 1:
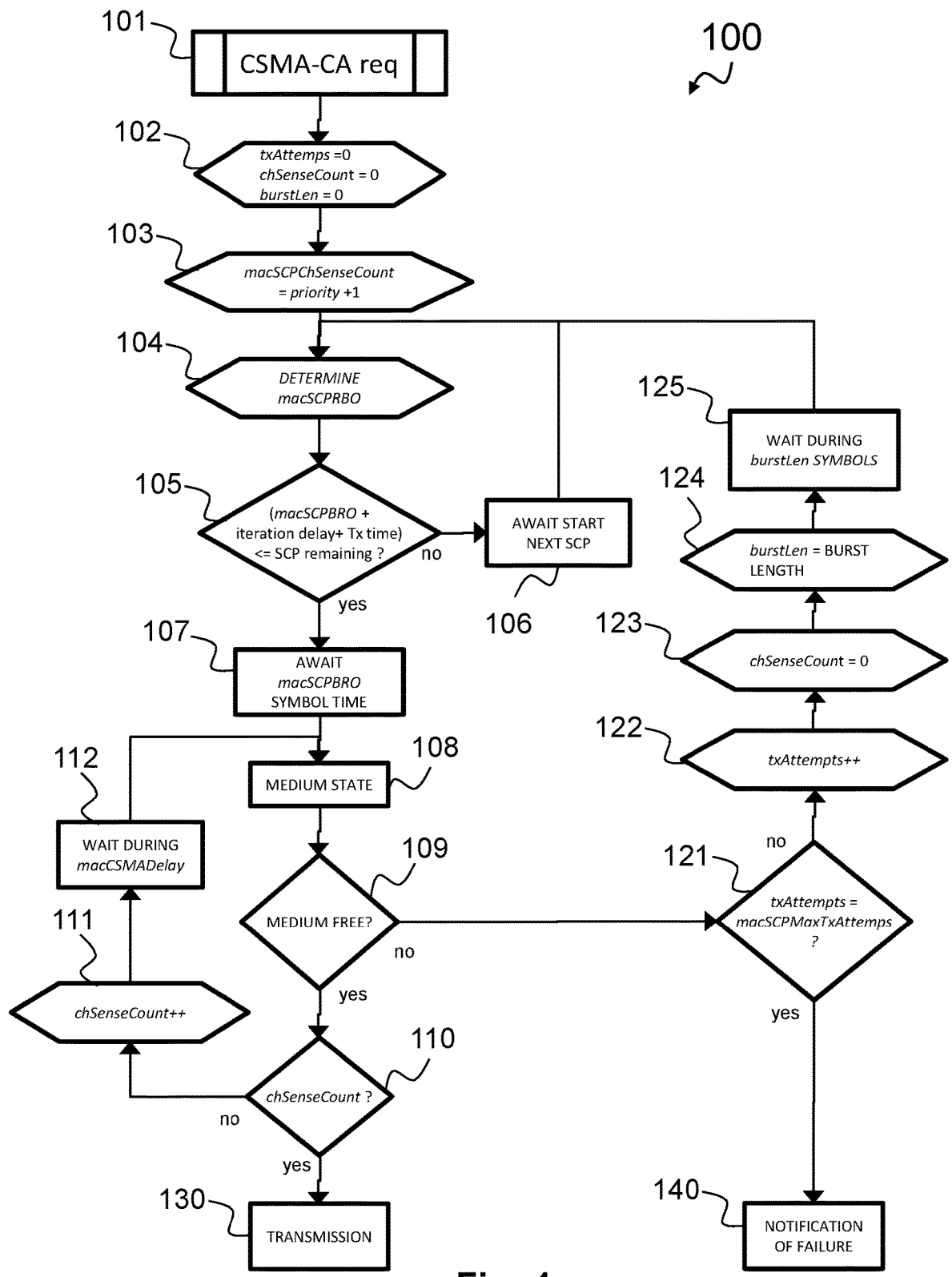
FIG. 1 illustrates schematically a method for access to a shared medium as described in a PRIME v1.4 technical specification.

The method 200 according to an embodiment of the invention described in FIG. 2 is characterised in that the maximum backoff time, described in FIG. 1 during step 104 for calculating the backoff time ("macSCPRBO"), depends on the message type to be sent over the medium by the electronic device.

This is because the method 200 described in FIG. 2 is roughly similar to the method 100 described in FIG. 1 with the notable exception of step 104, which is replaced by steps 250, 251 and 252. Steps 201 to 203 and respectively 205 to 212, 221 to 225, 230 and 240 are roughly similar to steps 101 to 103 and respectively 105 to 112, 121 to 125, 130 and 140. The method for access to the shared communication medium is in accordance with a communication standard of the IEEE Std 1901-2010 type, with the exception of step 105, the determination of a maximum backoff time "Tmax" for sending a message being dependent on the message type of the message to be sent.

During step 250, the electronic device determines the type of message to be sent. For this purpose, the electronic device can determine the value "PKT.C", coded in "1" bit, of the message to be sent. This information is included in the message to be sent. According to one embodiment, the electronic device uses any type of information included in the message to be sent in order to deduce therefrom a message type. Thus the message type may depend on the length of the message to be sent or a destination address of the message. For example, the electronic device may be able to determine whether the message type is "data packet".

According to the message type determined during step 250, the electronic device determines the value of a backoff time ("macSCPRBO") differently. According to the embodiment of the invention illustrated in FIG. 2, the electronic device determines the value of the backoff time in a step 251 for a message of the "data message" type, or in a step 252 for a message of another type.

The electronic device may determine the value of the backoff time using the formula previously described in FIG. 1, step 104, with:

for step 251, "macCSMAR1=1" and "macCSMAR2=0", and for step 252, "macCSMAR1=3" and "macCSMAR2=1".

In other words, the electronic device, for messages of the "data message" type, uses values of "macCSMAR1" and "macCSMAR2" lower than the values normally used and described in the technical specifications. Consequently the maximum backoff time "Tmax" for messages of the "data message" type is less than the maximum backoff time "Tmax" for messages of another type. Thus the latency of access to the medium is on average reduced for messages of the "data message" type, which makes it possible to reduce the sending latency for this type of message and to increase the transmission rate of the electronic device for this type of message. It should be noted that the choice of the values of "macCSMAR1" and "macCSMAR2" determines the maximum backoff time "Tmax" used for sending a message, and therefore the mean value of the backoff time for the type of message concerned. Choosing a reduced maximum backoff time "Tmax" for a message type allows a reduction in the mean backoff time, and therefore ultimately a reduction in the transmission latency for these messages.

According to a supplementary embodiment of the invention, the formula for calculating the backoff time ("macSCPRBO") used during steps 251 and 252 is different from the one used during step 104. In particular, this calculation formula cannot use the parameter "priority". Thus the formula for calculating the backoff time used during steps 251 and 252 may be:

$$macSCPRBO = random\left(0, \min\left((2^{(txAttemps+macCSMAR1)} + macCSMAR2), \left(\frac{macSCPLength}{2}\right)\right)\right)$$

In other words, the formula for calculating the backoff time is distinguished from the one used during step 104 through the use of a different maximum backoff time "Tmax", calculated as follows:

$$Tmax = \min\left((2^{(txAttemps+macCSMAR1)} + CSMAR2), \left(\frac{macSCPLength}{2}\right)\right)$$

According to one embodiment of the invention, another formula for calculating the backoff time is used.

Following step 251 or step 252, the electronic device continues the method at step 205, in a similar fashion to step 105.

Step 206 is distinguished from step 106 in that, following step 206, a new backoff time is generated, this backoff time generated being dependent on the message type (step 250, and then step 251 or 252).

According to a supplementary embodiment of the invention, a first list, comprising at least one first message type, is associated with a first maximum backoff time "Tmax" and at least one second list, comprising at least one second message type, is associated with a second maximum backoff time. The maximum backoff time "Tmax" for a message to be sent is chosen so as to be equal to the maximum backoff time "Tmax" associated with the list comprising the message type of said message to be sent by the electronic device. Thus several types of message can share the same maximum backoff time.

According to a supplementary embodiment of the invention, step 250 comprises a step of estimating a degree of occupation (or congestion) of the medium. Thus, when it is not transmitting, the electronic device is listening to the medium in order to determine whether the latter is busy or not, and can deduce from this a degree of occupation of the medium.

Depending on the degree of occupation of the medium, the electronic device may execute either step 251 or step 252. The electronic device can take account of the type of message for this purpose, or ignore the message type when the degree of occupation is below a predetermined threshold.

In other words, should the maximum backoff time "Tmax" be reduced only for messages of the "data message" type, the electronic device may decide to use this reduced maximum backoff time "Tmax" for all the message types when the degree of occupation of the medium is below a predetermined threshold. All the messages then benefit from a reduced maximum backoff time "Tmax", which reduces the medium-access latency. When the degree of occupation of the medium increases again, the electronic device then reserves a reduced maximum backoff time "Tmax" only for packets of the "data message" type.

Figure 3:
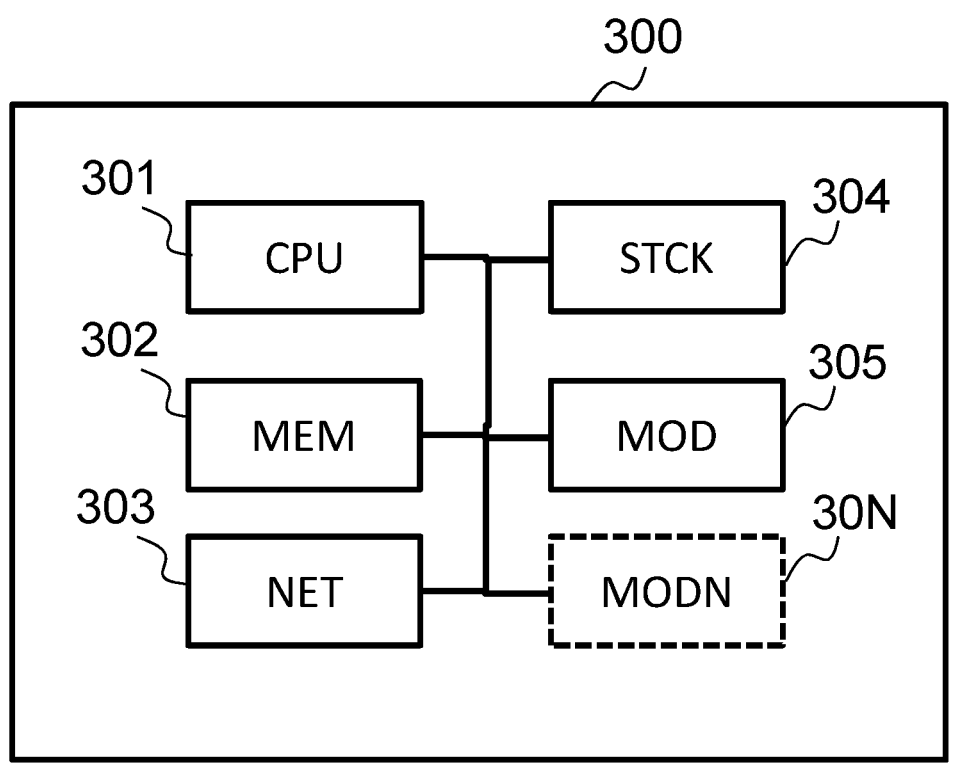
FIG. 3 illustrates schematically an electronic device suitable for implementing a method for access to a shared communication medium according to an embodiment of the invention.

FIG. 3 illustrates schematically an electronic device 300 suitable for implementing a method 200 for access to a shared communication medium according to an embodiment of the invention. The electronic device 300 comprises, connected by a communication bus: a processor or CPU (central processing unit) 301; a memory MEM 302 of the RAM (random access memory) type and/or ROM (read only memory) type, a network module NET 303, a storage module STCK 304 of the internal storage type, and possibly modules 305 to 30N of various natures. The electronic device 300 may thus comprise modules 305 and/or 30N depending on the nature of the electronic device 300. A module 305 may be an electricity or gas metering module. The storage module STCK 304 may be of the hard disk HDD (hard disk drive) or SSD (solid-state drive) type, or of the type reading an external storage medium, such as an SD (secure digital) card reader. The processor CPU 301 can record data on the storage module STCK 304 or read data recorded on the storage module STCK 304. These data may correspond to configuration parameters of the electronic device 300 or to information received for example in a message received by the module NET 303, or via another communication module 30N. The module NET 303 may be in accordance with a standard of the PLC type, for example PRIME v1.4, or more generally a communication standard of the IEEE Std 1901-2010 type, with the exception however of the step for determining a maximum backoff time "Tmax" for sending a message.

The processor CPU 301 is capable of executing instructions loaded in the memory MEM 302, for example from a storage module STCK 304 or from a communication network via the module NET 303, or from another communication module 30N for example. When the electronic device 300 is powered up, the processor CPU 301 is capable of reading instructions from the memory MEM 302 and executing them. These instructions form a computer program causing the implementation, by the processor CPU 301, or all or some of the methods and steps described above. Thus all or some of the methods and steps described above may be implemented in software form by the execution of a set of instructions by a programmable machine, such as a DSP (digital signal processor) or a microcontroller. All or some of the methods and steps described here may also be implemented in hardware form by a machine or a dedicated component such as an FPGA (field-programmable gate array) or an ASIC (application-specific integrated circuit). The electronic device 300 is typically a communicating energy meter, for example a meter having so-called AMR (automated meter reading) technologies. The electronic device 300 can measure, in a detailed and precise fashion, and optionally in real time, electricity, water or gas consumption. The transmission of the data takes place over a shared medium, for example radio waves or powerline carriers (PLCs), to a manager of a distribution network responsible for the metering.

The electronic device 300 is suitable for implementing the method 200 for access to a shared communication medium, referred to as the medium, access to the medium being of the "carrier sense multiple access" type. The electronic device 300, in order to be able to send a message over the medium, the message comprising information representing a message type, waits for a backoff time in order to check whether the medium is available for sending the message, the backoff time being determined randomly and lying between a minimum backoff time and a maximum backoff time. The electronic device 300 is suitable for determining the maximum backoff time "Tmax" according to the type of message to be sent over the medium.

Figure 4:
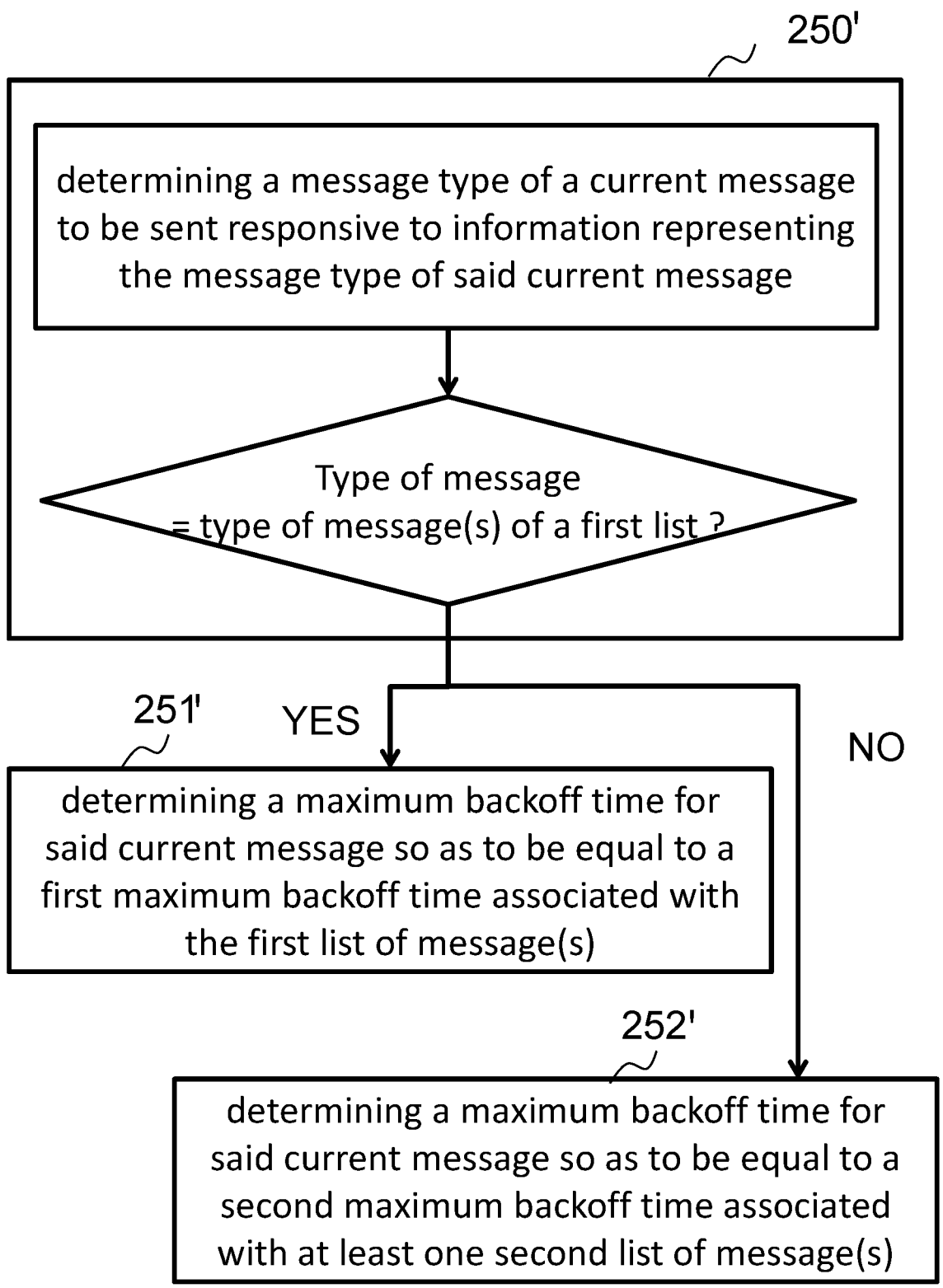
FIG. 4 illustrates schematically a method for access to a shared medium according to an embodiment of the invention.

FIG. 4 illustrates a method for access to a shared medium according to an embodiment of the invention. Steps 250', 251' and 252' of FIG. 4 respectively correspond to steps 250, 251 and 252 of FIG. 2.

The invention claimed is:

1. A method for providing access to a shared communication medium, the access to the medium being of a carrier sense multiple access type, wherein an electronic device, in order to send a message over the medium, the message comprising information representing a message type, waits for a particular backoff time before checking whether the medium is available to send the message, the method comprising:
   determining the type of the message to be sent responsive to the information representing the type of said message,
   determining a specific maximum backoff time, wherein said specific maximum backoff time is equal to a first maximum backoff time associated with a first list in the case where said first list comprises message(s) of the type of said message and wherein said specific maximum backoff time is equal to a second maximum backoff time associated with at least one second list in the case where said at least one second list comprises message(s) of the type of said message, wherein either said first list or said at least one second list comprises message(s) of the type of said current message, wherein said first list of message(s) comprises at least one first type of message(s), and wherein said at least one second list of message(s) comprises at least one second type of message(s);
   determining the particular backoff time randomly, wherein the determined particular backoff time lies between a minimum backoff time and the specific maximum backoff time.

2. The method according to claim 1, wherein said at least one first type of message(s) is known as data message.

3. The method according to claim 1, wherein the first maximum backoff time is less than the second maximum backoff time.

4. The method according to claim 3, wherein the method comprises, for said electronic device sharing access to the medium, the following steps:
   estimating a degree of occupation of the medium, and
   if the degree of occupation of the medium is less than a predetermined value, then:
   the specific maximum backoff time is determined so as to be equal to the first maximum backoff time independently of the type of packet to be sent.

5. The method according to claim 1, wherein determining a specific maximum backoff time comprises determining the specific maximum backoff time as follows:

$$Tmax = \min\left(2^{(txAttemps+macCSMAR1)} + macCSMAR2), \left(\frac{macSCPLength}{2}\right)\right)$$

with Tmax being the specific maximum backoff time, txAttemps being a parameter incremented one by one and macSCPLength being a variable representing a duration of a contention period, wherein values of macCSMAR1 and macCSMAR2 are determined according to the type of said message.

6. The method according to claim 5, wherein the value macCSMAR1 and respectively macCSMAR2 are chosen so as to be equal to one and respectively zero, for at least one type of message.

7. A non-transitory computer readable medium storing a computer program product, the computer program product comprising instructions for the implementation, by a processor, of the method providing access to a shared communication medium, according to claim 1, when said computer program is executed by said processor.

8. An electronic device suitable for implementing a method for providing access to a shared communication medium, the access to the medium being of a carrier sense multiple access type, the electronic device, in order to send a message over the medium, the message comprising information representing a type of message, waiting for a particular backoff time before checking whether the medium is available for sending the current message, the electronic device being configured for:
   determining the type of the message to be sent responsive to the information representing the type of message of said current message,
   determining a specific maximum backoff time, wherein said specific maximum backoff time is equal to a first maximum backoff time associated with a first list in the case where said first list comprises message(s) of the type of said message and wherein said specific maximum backoff time is equal to a second maximum backoff time associated with at least one second list in the case where said at least one second list comprises message(s) of the type of said message, wherein either said first list or said at least one second list comprises message(s) of the type of said current message, wherein said first list of message(s) comprises at least one first type of message(s), and wherein said at least one second list of message(s) comprises at least one second type of message(s);
   determining the particular backoff time randomly, wherein the determined particular backoff time lies between a minimum backoff time and the specific maximum backoff time.

* * * * *